11-25-75 OR 3,922,069

United States Patent [19]

Kishikawa et al.

[11] 3,922,069

[45] Nov. 25, 1975

[54] COLOR SEPARATING PRISM SYSTEM

[75] Inventors: Toshiro Kishikawa; Kazuo Yoshikawa; Toshiro Yamauchi, all of Omiya; Takeshi Higuchi, Tokyo, all of Japan

[73] Assignee: Fuji Photo Optical Co., Ltd., Omiya, Japan

[22] Filed: Mar. 21, 1974

[21] Appl. No.: 453,439

[30] Foreign Application Priority Data

Apr. 9, 1973 Japan ................................ 48-40241

[52] U.S. Cl. .................................. 350/173; 358/50

[51] Int. Cl.² .......................................... G02B 27/14

[58] Field of Search ......... 350/173, 171; 358/50, 52

[56] References Cited

UNITED STATES PATENTS 3,202,039 8/1965 DeLang et al. ..................... 350/173

3,718,752 2/1973 Katsuta et al. .................. 350/173 X

*Primary Examiner*—David H. Rubin

*Attorney, Agent, or Firm*—Fleit & Jacobson

[57] ABSTRACT

Three prism blocks are cemented together with two differently colored dichroic layers interposed between the two boundaries respectively. The first entrance face of the prism system serves as a total reflection face for totally reflecting the light reflected by the two dichroic layers. The light reflected totally by the entrance face is all directed to the same side of the non-reflecting optical axis so that the image pickup tubes to receive the light are located on the same side of the prism system.

12 Claims, 6 Drawing Figures

COLOR SEPARATING PRISM SYSTEM

BACKGROUND OF THE INVENTION

1. Field of the Invention

This invention relates to a color separating optical system, and more particularly to a color separating prism system adapted to be used in an optical instrument such as a color television camera or the like. The color separating prism system may be located between a zoom lens system of a comparatively long back focal length and the image pickup tube of a color television camera, or may be inserted into an objective lens system of a color television camera.

2. Description of the Prior Art

A color separating prism system of comparatively simple construction adapted to be incorporated in a color television camera is well known in the art. A typical adaptation of the conventional color separating prism system is disclosed in U.S. Pat. No. 3,202,039 patented to H. de Lang et al. The color separating prism system disclosed in the patent is provided with two dichroic layers and at least an air space that forms a narrow plane parallel gap between the two dichroic layers. This air space is inevitably necessary in the conventional prism system in order to totally reflect the light beam reflected by the second dichroic layer.

The conventional color separating prism system as disclosed in said patent is further characterized in that the reflected color light beams divided from the non-reflected light beam entering the prism system are directed to the opposite sides of the optical axis of the incident light, that is of the light beam transmitting through the two dichroic layers.

The above-described conventional color separating prism system still entails problems which derive from the particular construction of the system. Since the air space must be precisely formed to obtain parallel air-glass transitions, a high degree of technique is required in forming precisely parallel flat surfaces. Any deviation from perfect parallelism has a deteriorating effect on the image focussing performance of the lens system associated with the prism system. Further, since the color light beams divided from the incident light are directed to the opposite sides with respect thereto, the television camera including the image pickup tubes for receiving the light beams must necessarily be of large size. In addition, since the image pickup tubes are oriented at large angles to each other, the influence of the terrestrial magnetism on the tubes varies greatly. The variation in the influence of terrestrial magnetism causes deterioration in the registration of the images taken by the different image pickup tubes. Accordingly, the three image pickup tubes are preferably oriented as close to parallel as possible.

SUMMARY OF THE INVENTION

In view of the above mentioned drawbacks, problems and requirements inherent in the conventional color separating prism system, the primary object of the present invention is to provide a color separating optical system without an air space in the prism system which is easy to manufacture and has high performance.

Another object of the present invention is to provide a color separating prism system which occupies a small space and directs the two reflected light beams to the same side of the optical axis of the incident light thus making it possible to reduce the overall size of the television camera.

Still another object of the present invention is to provide a color separating prism system in which the two reflected light beams are directed to the same side of the optical axis of the incident light so that the image pickup tubes can be oriented with a small angle formed therebetween thus reducing the difference in the influence that the terrestrial magnetism has on the tubes and enhancing the performance of the prism system.

A further object of the present invention is to provide a color separating prism system in which the dichronic layer provided in the system is protected from chemical deterioration by not being exposed to the air.

The color separating prism system in accordance with the present invention comprises a prism block having on the opposite faces thereof dichroic layers respectively and two prism blocks cemented on the dichronic layers to form an assembly of prisms having two boundary dichroic layers and an entrance face and three emanating faces. The entrance face serves as a total reflection face to totally reflect the light reflected by the dichroic layers.

In accordance with the present invention, the manufacture of the color separating prism is markedly facilitated since the two dichroic layers are applied on one prism block and two other prism blocks are simply cemented on the layers respectively. No air space requiring precisely processed parallel planes is formed in this prism system. Since the two reflected light beams are directed to the same side of the optical axis of the incident light of the prism system, the angles formed between the image pickup tubes are made small and the difference in the influence of terrestrial magnetism on the image pickup tubes is reduced so that the quality of the color image reproduced by the television system is improved. Further, since the prism system is made compact in size and the image pickup tubes are arranged on the same side of the optical axis of the incident light, the whole size of the television camera employing the prism system in accordance with the present invention can be made compact. Since the dichroic layers are interposed between the surfaces of prism blocks, the dichroic layers are not exposed to the air and accordingly the quality of the dichroic layers is not chemically deteriorated by contact with the air. Besides, since the total reflection face of the prism system is located on the same side of the two dichroic layers, the light transmitting through the first dichroic layer and reflected by the second dichroic layer passes through the first layer twice, and accordingly, the light is improved in its spectral characteristics as a result of being twice filtered by the first dichroic layer.

The above and other objects, features and advantages of the present invention will be made more apparent from the following detailed description of the preferred embodiments thereof taken in conjunction with the accompanying drawing as described hereinbelow.

PREFERRED EMBODIMENTS OF THE INVENTION

Figures 1, 2:
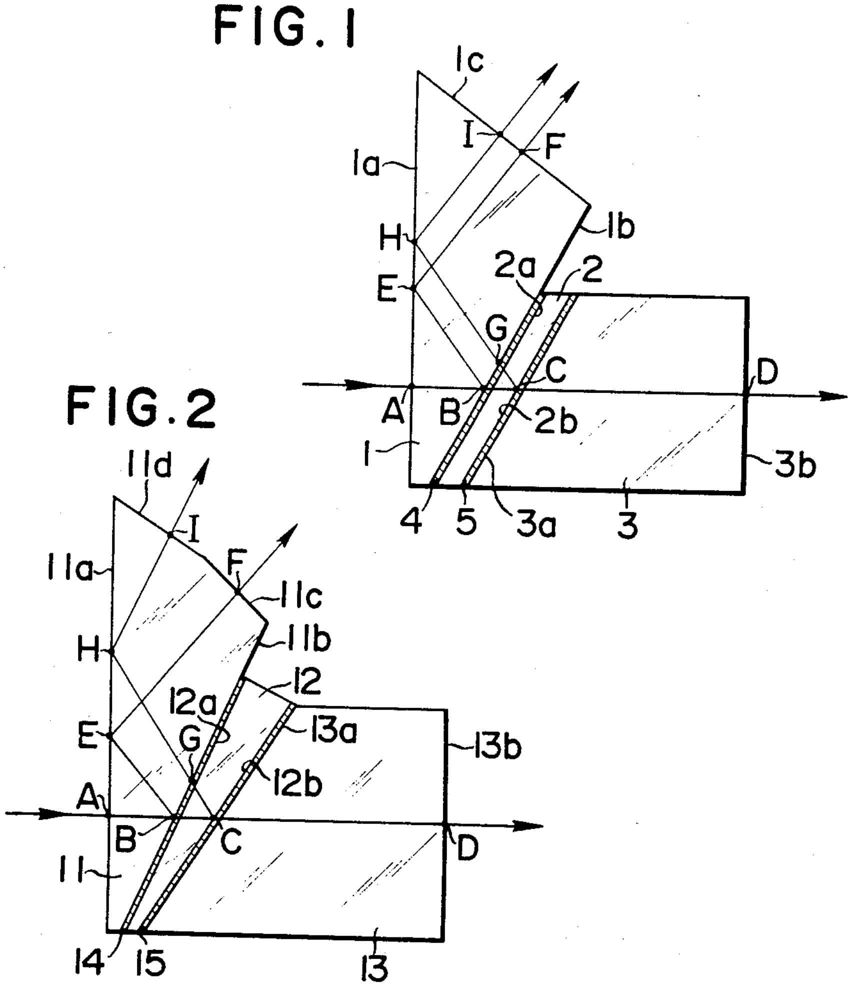
FIG. 1 is a side elevation of the color separating prism system in accordance with the present invention showing the basic principle of the invention.
FIG. 2 is a side elevation of an embodiment of the color separating prism system in accordance with the present invention.

Referring to FIG. 1 which shows the basic construction of the color separating prism system in accordance with the present invention, the prism system comprises a first prism block 1, a second prism block 2 and a third prism block 3, the second prism block 2 being interposed between the first and third prism blocks 1 and 3 cemented therewith with dichroic layers 4 and 5 interposed between the first and second prism blocks 1 and 2 and between the second third prism blocks 2 and 3, respectively. The dichroic layers 4 and 5 are first applied on the opposite faces 2*a* and 2*b* of the second prism block 2, and then the first and third prism blocks 1 and 3 are cemented thereon as shown in FIG. 1. The first prism block 1 has an entrance face 1*a* extending perpendicular to the non-reflecting optical axis A-B-C-D of the light incident thereto. The rear face 1*b* of the first prism block 1 which is in direct contact with the first dichroic layer 4 is inclined with respect to the non-reflecting optical axis A-B-C-D. The first dichroic layer 4, for instance, reflects the red light component and transmits the remainder and the second dichroic layer 5 reflects the blue light component and transmits the remaining green light component. The red light component is therefore reflected by the boundary face between the dichroic layer 4 and the rear face 1*b* of the first prism block 1 at the point B and then reflected by the first entrance face 1*a* serving as a totally reflecting surface at the point E and emanates from the first prism block 1 through the top face 1*c* thereof at the point F.

The light passing through the first dichroic layer 4 is then partly reflected by the second dichroic layer 5. The blue light component is reflected thereby and the remaining green light component transmits therethrough along the non-reflecting optical axis A-B-C-D. The blue light component reflected by the second dichroic layer 5 transmits through the first dichroic layer 4 again at the point G and is reflected by said totally reflecting surface 1*a* of the first prism block 1 at the point H and then emanates from the first prism block 1 through the top face 1*c* at the point I. The remaining green light component transmitting through both the dichroic layers 4 and 5 emanates from the third prism block 3 through the emanating face 3*b* which is normal to the non-reflecting optical axis A-B-C-D. The entrance face 3*a* of the third prism block 3 which is in direct contact with the second dichroic layer 5 is inclined at an angle with respect to the non-reflecting optical axis A-B-C-D.

As described hereinabove, the color separating prism system in accordance with the present invention is provided with only one totally reflecting surface 1*a*. The totally reflecting surface 1*a* reflects the light components reflected by both the dichroic layers 4 and 5. Since the prism system is provided with only one totally reflecting surface 1*a* which must be processed to a high degree of precision, the manufacture of the prism system is markedly facilitated and the performance of the prism is ensured.

Thus, the incident light entering the prism system through the entrance face l*a* of the first prism block 1 is divided into three signal systems containing different color light components, i.e., a red light component emanating through the top face 1c of the first prism block 1 at the point F, a blue light component emanating through the top face 1c of the first prism block 1 at the point I, and a green light component emanating through the emanating face 3*b* of the third prism block 3.

In the above described construction of the prism system shown in FIG. 1, the two dichroic layers 4 and 5 are substantially parallel to each other and accordingly the optical axis E–F of the red light component is substantially parallel to the optical axis H–I of the blue light component. In sush an arrangement, the two image pickup tubes must be located close to each other. In case of using image pickup tubes of a large diameter, it is difficult to provide the two tubes on the said optical axes E–F and H–I. This problem can be solved by inclining one dichroic layer with respect to the other.

One embodiment of the present invention in which one dichroic layer is inclined with respect to the other to make the two emanating light components separate from each other is shown in FIG. 2, in which the elements similar to those shown in FIG. 1 are indicated with similar reference numerals.

Referring to FIG. 2, three prism blocks 11, 12 and 13 are cemented together with dichroic layers 14 and 15 interposed therebetween in just the same manner as employed in the prism system shown in FIG. 1. The opposite surface 12*a* and 12*b* of the second prism block 12 are formed not to be in parallel to each other to reflect the red and blue light components in the different directions so that the two light components may emanate from the top face of the first prism block 11 in diverging directions. In the embodiment shown in FIG. 2, the top face of the first prism block 11 comprises two flat 11*c* and 11*d* extending in perpendicular to the optical axes E–F and H–I, respectively. The entrance face 11*a* of the first prism block 11 and the emanating face 13*b* of the third prism block 13 are parallel to each other and extend in perpendicular to the non-reflecting optical axis A-B-C-D.

Figure 3:
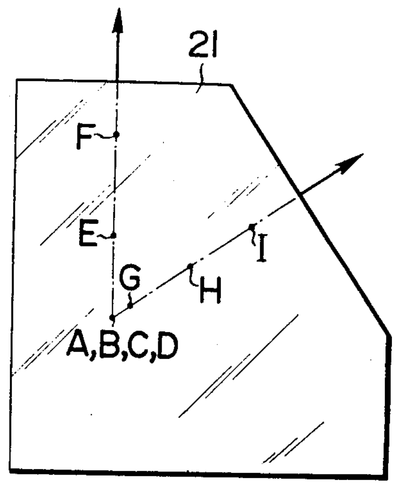
FIG. 3 is a front elevational view of another embodiment of the color separating prism system in accordance with the present invention.
Figure 4:
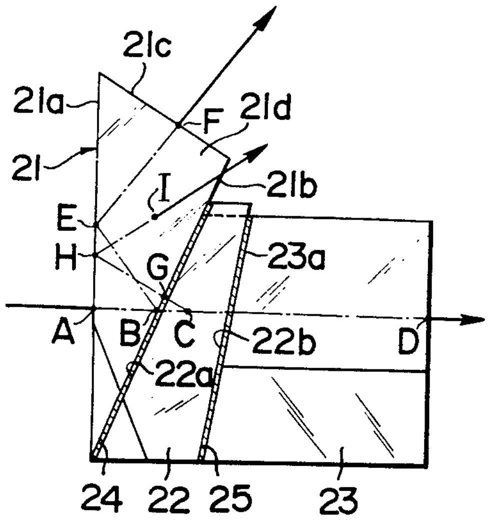
FIG. 4 is a side elevation of the embodiment shown in FIG. 3.
Figure 5:
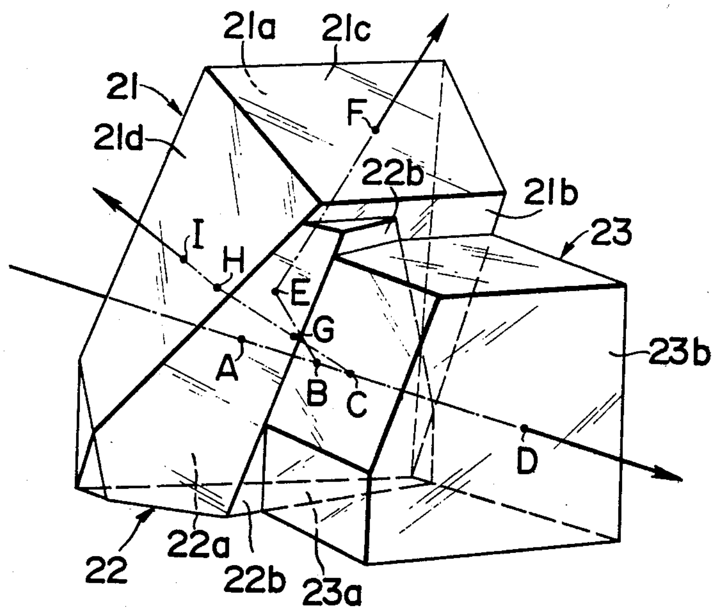
FIG. 5 is a perspective view taken obliquely from the backside of the prism system as shown in FIGS. 3 and 4.

Another embodiment of the present invention in which one dichroic layer is inclined with respect to the other to direct the two emanating light components in diverging directions is shown in FIGS. 3, 4 and 5, in which the elements similar to those shown in FIG. 1 are indicated with similar reference numerals.

Referring to FIGS. 3, 4 and 5, three prism blocks 21, 22 and 23 are cemented together with differently colored dichroic layers 24 and 25 interposed therebetween in just the same manner as employed in the above-described embodiments. One dichroic layer 25 is oriented in a position rotated about the non-reflecting optical axis A-B-C-D from the position of the dichroic layer 5 in the prism system shown in FIG. 1, so that the red and blue light components may be reflected by the dichroic layers 24 and 25 in the diverging directions. The first prism block 21 having an entrance face 21*a* extending in perpendicular to the incident light has a rear face 21*b*, a top face 21*c* and a side face 21*d*, all extending in planes oblique to the non-reflecting optical axis. The second prism block 22 having an entrance face 22*a* cemented to the rear face 21*b* of the first prism block 21 with the first dichroic layer 24 which reflects the red light component and transmits the remainder interposed therebetween, is provided with an emanating face 22*b* which extends in a plane rotated from the plane parallel to the entrance face 22*a* about the non-reflecting optical axis A-B-C-D. The third prism block 23 is provided with an entrance face 23*a* cemented with the emanating face 22*b* of the second prism block 22 with the second dichroic layer 25 which reflects the blue light component interposed therebetween and an emanating face 23*b* extending in parallel to said entrance face 21*a* of the first prism block 21. The red light component reflected by said first dichroic layer 24 at the point B is directed obliquely upward as clearly shown in the drawing and totally reflected by the entrance face 21*a* of the first prism block 21 at the point E and emanates from the first prism block 21 through the top face 21*c* at the point F. The blue light component reflected by the second dichroic layer 25 at the point C is directed obliquely sideward and transmits through the first dichroic layer 24 at the point G and is totally reflected by the entrance face 21*a* of the first prism block 21 at the point H and emanates from the first prism block 21 through the side face 21*d* at the point I. Since the emanating directions of the red light component and the blue light component are diverged, there is a large space between the two emanating light components and accordingly there is no problem in provision of the image pickup tubes for the red and blue light components. Further, in spite of the large angle resulting between the two emanating optical axes, the whole space occupied by the prism system and the image pickup tubes is comparatively small since the two emanating light components are directed to the same side, i.e., the upper side as shown in FIG. 4, of the non-reflecting optical axis A-B-C-D.

It will be understood that the number of prism blocks cemented together into a prism system is not limited to three, but may be more than three with more than two dichroic layers.

Figure 6:
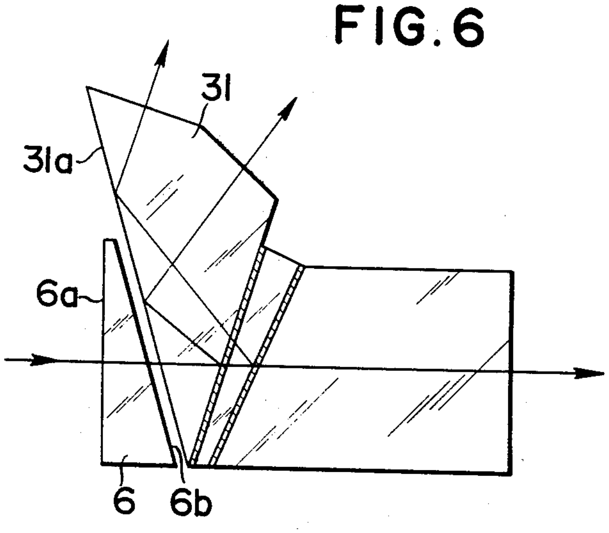
FIG. 6 is a side elevation of still another embodiment of the color separating prism system of the invention.

Further, it will be understood that the entrance face of the first prism block can be inclined to the plane perpendicular to the incident light if an additional prism having an entrance face extending in perpendicular to the incident light and an emanating face extending in parallel to said entrance face of the first prism block is provided as shown in FIG. 6. In the embodiment shown in FIG. 6, an additional prism block 6 having an entrance face 6*a* extending in perpendicular to the optical axis of the incident light and an emanating face 6*b* extending in parallel to the entrance face 31*a* of the first prism block 31 is provided just in front of the first prism block 31.

We claim:

1. A color separating prism system adapted to be used for a color television camera having a non-reflecting optical axis consisting of a single totally reflecting surface and comprising:

a first prism block having an entrance face extending across said non-reflecting optical axis, a first emanting face extending across said non-reflecting optical axis behind said entrance face and being inclined in one direction at an angle with respect to a plane parallel to said entrance face, and a second emanating face extending across said entrance face and said first emanating face for transmitting light rays reflected by said entrance face, said single totally reflecting surface being located on the rear of said entrance face and presented toward said first and second emanating faces;

a second prism block having an entrance face and an emanating face both extending across said non-reflecting optical axis;

a third prism block having an entrance face extending across said non-reflecting optical axis and being inclined in the same direction as that of said first emanating face of the first prism block at an angle with respect to the plane parallel to said entrance face, and an emanating face extending across the non-reflecting optical axis behind said entrance face thereof;

a first dichroic layer which reflects a first color light component and transmits the remainder; and a second dichroic layer which reflects another color light component contained in said remainder transmitting through the first dichroic layer and transmits the remainder;

said first dichroic layer being interposed in direct contact between said first emanating face of the first prism block and said entrance face of the second prism block without any air gap therebetween, said second dichroic layer being interposed in direct contact with said emanating face of the second prism block and said entrance face of the third prism block without any air gap therebetween;

said first emanating face of the first prism block and said entrance face of the third prism block being so inclined that light rays reflected by the dichroic layers are reflected toward said single totally reflecting surface so that said light rays are totally reflected by said single totally reflecting surface located on the rear of said entrance face of the first prism block and emanate through said second emanating face thereof.

2. A color separating prism system for a color television camera as defined in claim 1 wherein said entrance face of the first prism block is substantially perpendicular to the non-reflecting optical axis.

3. A color separating prism system for a color television camera as defined in claim 2 wherein said emanating face of the third prism block is substantially parallel to the entrance face of the first prism block.

4. A color separating prism system for a color television camera as defined in claim 1 wherein said entrance face of the third prism block is further inclined at an angle with respect to the plane parallel to said first emanating face of the first prism block so that the light rays reflected by the second dichroic layer may be directed in a direction inclined at an acute angle with respect to the direction in which the light rays reflected by the first dichroic layer are directed.

5. A color separating prism system for a color television camera as defined in claim 4 wherein said angle at which the entrance face of the third prism block is inclined with respect to the plane parallel to said first emanating face of the first prism block is the same as the angle at which said first emanating face of the first prism block is inclined with respect to the plane parallel to said entrance face of the first prism block.

6. A color separating prism system for a color television camera as defined in claim 5 wherein said second emanating face of the first prism block comprises two emanating faces which are inclined at an angle to each other and are substantially perpendicular to the optical axes of the light rays reflected by the two dichroic layers, respectively.

7. A color separating prism system for a color television camera as defined in claim 4 wherein said direction in which the entrance face of the third prism block is inclined with respect to the plane parallel to said first emanating face of the first prism block is different from the direction in which said first emanating face of the first prism block is inclined with respect to the plane parallel to said entrance face of the first prism block.

8. A color separating prism system for a color television camera as defined in claim 7 wherein said first emanating face of the first prism block is so inclined that the first dichoric layer adjacent thereto may reflect the light rays incident thereto coming along the non-reflecting optical axis obliquely upward in a vertical plane including the non-reflecting optical axis toward the entrance face of the first prism block, and said entrance face of the third prism block is so inclined that the second dichroic layer adjacent thereto may reflect the light rays incident thereto coming along the non-reflecting optical axis obliquely upward in a plane including the non-reflecting optical axis and rotated at an angle from said vertical plane toward the entrance face of the first prism block.

9. A color separating prism system for a color television camera as defined in claim 8 wherein said second emanating face of the first prism block comprises a top face extending across the entrance face and the first emanating face of the first prism block in perpendicular to the optical axis of the light rays reflected from the first dichroic layer and totally reflected by the entrance face of the first prism block, and a side face extending across the entrance face and the first emanating face of the first prism block and said top face in perpendicular to the optical axis of the light rays reflected from the second dichroic layer and totally reflected by the entrance face of the first prism block.

10. A color separating prism system for a color television camera as defined in claim 1 wherein said entrance face of the first prism is inclined with respect to a plane perpendicular to the non-reflecting optical axis and an additional prism block is provided in front of the first prism block, said additional prism block having an entrance face extending in perpendicular to the non-reflecting optical axis and an emanating face extending in parallel to the entrance face of the first prism block.

11. A color separating prism system for a color television camera consisting of a single totally reflective surface and comprising an intermediate prism block having non-parallel opposite faces, differently colored dichroic layers applied on said faces of the intermediate prism block respectively, a front prism block having an entrance face and cemented on one of said faces with one of said dichroic layers interposed without any air gap therebetween, said single totally reflecting surface being located on the rear of said entrance face and presented toward said intermediate prism, and a rear prism block cemented on the other of said faces with the other of said dichroic layers interposed without any air gap therebetween, whereby two different color light components of the light passing through said prism blocks are reflected respectively by said dichroic layers and totally reflected by said single totally reflecting surface on said entrance face of the front prism block and emanate from the front prism block through and emanating face of the first prism block.

12. A color separating prism system as defined in claim 11 wherein said two color light components are reflected by the dichroic layers to the same side of the optical path of the light passing through the prism blocks.

* * * * *